(12) United States Patent
Kasperchik et al.

(10) Patent No.: US 7,699,461 B2
(45) Date of Patent: Apr. 20, 2010

(54) PERMANENT FIXATION OF DYES TO SURFACE-MODIFIED INORGANIC PARTICULATE-COATED MEDIA

(75) Inventors: Vladek P Kasperchik, Corvallis, OR (US); Palitha Wickramanayake, Corvallis, OR (US); James P Shields, Philomath, OR (US); Gary Allan Ungefug, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 75 days.

(21) Appl. No.: 11/697,182

(22) Filed: Apr. 5, 2007

(65) Prior Publication Data

US 2007/0188579 A1    Aug. 16, 2007

Related U.S. Application Data

(62) Division of application No. 10/688,322, filed on Oct. 16, 2003, now Pat. No. 7,226,647.

(51) Int. Cl.
  *B41J 2/01*    (2006.01)
(52) U.S. Cl. ............... 347/105; 347/101; 428/32.1
(58) Field of Classification Search .......... 347/105, 347/101; 428/195, 32.1
  See application file for complete search history.

(56) References Cited

U.S. PATENT DOCUMENTS

| | | | |
|---|---|---|---|
| 4,877,451 A | 10/1989 | Winnik et al. | |
| 5,372,884 A | 12/1994 | Abe et al. | |
| 5,429,860 A * | 7/1995 | Held et al. | ........... 347/105 |
| 5,612,281 A | 3/1997 | Kobayashi et al. | |
| 5,873,934 A | 2/1999 | Kunii et al. | |
| 5,919,846 A | 7/1999 | Batlaw et al. | |
| 5,965,252 A | 10/1999 | Santo et al. | |
| 5,993,960 A | 11/1999 | Nakayama et al. | |
| 6,096,469 A | 8/2000 | Anderson et al. | |
| 6,228,475 B1 | 5/2001 | Chu et al. | |
| 6,238,784 B1 | 5/2001 | Mochizuki et al. | |
| 6,323,257 B1 * | 11/2001 | Moffatt et al. | ........... 523/160 |
| 6,432,550 B1 | 8/2002 | Ohbayashi et al. | |
| 6,492,005 B1 | 12/2002 | Ohbayashi et al. | |
| 6,783,819 B2 * | 8/2004 | Deardurff et al. | ........ 428/32.36 |
| 6,797,347 B2 * | 9/2004 | Chow | ............ 428/32.36 |
| 6,841,207 B2 * | 1/2005 | Burch et al. | ............ 428/32.36 |
| 6,951,672 B2 * | 10/2005 | Vincent et al. | ............. 428/32.3 |

FOREIGN PATENT DOCUMENTS

| EP | 0 465 124 A1 | 1/1992 |
|---|---|---|
| EP | 1 352 757 A2 * | 10/2003 |

* cited by examiner

*Primary Examiner*—Manish S Shah

(57) ABSTRACT

Systems and methods for producing permanent ink-jet images are provided. In one embodiment, a system includes a media substrate coated with a porous media coating, wherein the porous media coating having inorganic porous particulates, and wherein at least a portion of the inorganic porous particulates have a first reactive group covalently attached thereto. The system further includes an ink-jet ink containing a dye, wherein the dye includes a second reactive group, and wherein the first reactive group and the second reactive group are configured to react with one another upon contact to form a covalent bond. In an alternative embodiment, a method of producing permanent ink-jet images can includes the steps of covalently bonding a first reactive group to an inorganic porous particulate; coating the inorganic porous particulate onto a media substrate to form a coated media substrate; ink-jetting a dye-containing ink-jet ink composition onto the coated media substrate, wherein the dye includes a second reactive group. The first reactive group and the second reactive group, upon contact, can interact to form a covalent bond.

8 Claims, No Drawings

PERMANENT FIXATION OF DYES TO SURFACE-MODIFIED INORGANIC PARTICULATE-COATED MEDIA

This is a division of application Ser. No. 10/688,322, filed Oct. 16, 2003 now U.S. Pat. No. 7,226,647.

FIELD OF THE INVENTION

The present invention is drawn to the attachment of dyes to media surfaces, and more specifically, to systems and methods for covalently bonding a dye colorant to a media surface coated with surface modified inorganic porous particulates.

BACKGROUND OF THE INVENTION

Ink-jet ink compositions typically comprise a liquid vehicle and a colorant, the latter of which may be a dye or a pigment. Ink-jet inks used in photographic image printing almost always utilize water-soluble dyes. As a result, such dye-based ink-jet ink compositions are usually less waterfast than pigment-based ink-jet ink compositions, e.g., images tend to shift in hue and edge sharpness is reduced upon exposure to humid conditions. In addition, images created from these water-soluble dye-based ink-jet ink compositions tend to fade over time, such as when exposed to ambient light and/or air.

Print media surfaces can play a key role in the fade properties and humid fastness of ink-jet produced printed images. Thus, for a given ink, the degree of fade and water fastness can be dependent on the chemistry of the media surface. This is especially true in the case of images printed with dye-based ink-jet ink compositions. As a result, many ink-jet inks can be made to perform better when an appropriate media surface is selected.

In order for the ink-jet industry to effectively compete with silver halide photography, it is desirable that ink-jet produced images be color saturated, fade resistant, and water fast. Thus, enhanced permanence of dye-based ink-jet ink produced images is becoming more and more integral to the long-term success of photo-quality ink-jet ink technologies. At this point in time, for instance, according to accelerated tests and "industry standard" failure criteria, photographs typically will last about 13 to 22 years under fluorescent light exposure. The best dye-based ink-jet ink printers produce prints that last for much less time under similar conditions.

A few categories of photographic ink-jet media are currently available, including polymer coated media, clay coated media, and porous particulate coated media. It is the polymer-coated media that provides for the longest lasting ink-jet ink produced images. However, this category of media is generally inferior in dry time and humid fastness relative to porous coated media. On the other hand, image fade resistance and humid fastness of porous coated media is generally lower than that of its polymer coated media counterpart. Therefore, there is a great desire to improve the image permanence of ink-jet ink images printed on porous coated media.

SUMMARY OF THE INVENTION

In accordance with embodiments of the present invention, the use of a media substrate and a dye, both containing reactive groups designed to react with one another, can more effectively immobilize the dye on the substrate and thus reduce ink spreading and increase water fastness.

Specifically, a system for producing permanent ink-jet images can comprise a media substrate coated with a porous media coating, and an ink-jet ink including a dye. The porous media coating can comprise inorganic porous particulates, wherein at least a portion of the inorganic porous particulates have a first reactive group covalently attached thereto. The dye of the ink-jet ink can comprise a second reactive group attached thereto, wherein the first reactive group and the second reactive group are configured to react with one another upon contact to form a covalent bond.

Alternatively, a method of producing permanent ink-jet images can comprise steps of a) covalently bonding a first reactive group to an inorganic porous particulate; b) coating the inorganic porous particulate onto a media substrate to form a coated media substrate; and c) ink-jetting a dye-containing ink-jet ink composition onto the coated media substrate. The dye of the ink-jet ink can include a second reactive group covalently attached thereto, wherein the first reactive group and the second reactive group interact upon contact to form a covalent bond.

In yet another alternative embodiment, a printed image on a media substrate can comprise a media substrate coated with a porous coating, and an ink-jet ink including a dye printed on the porous coating. The porous coating can comprise inorganic porous particulates, wherein at least a portion of the inorganic porous particulates have a first reactive group covalently. The dye of the ink-jet ink can comprise a second reactive group attached thereto, wherein the first reactive group and the second reactive group are covalently bonded to one another.

Additional features and advantages of the invention will be apparent from the detailed description that follows, which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

As used in this specification and the appended claims, the singular forms "a," "an," and "the" include plural referents unless the content clearly dictates otherwise.

"Media substrate" or "substrate" includes any substrate that can be used in the ink-jet printing arts including papers, overhead projector plastics, coated papers, fabric, art papers, e.g. water color paper, and the like.

"Porous media coating" typically includes inorganic particulates, such as alumina or silica particulates, bound together by a polymeric binder. Optionally, mordants and/or other additives can also be present. The composition can be used as a coating for various media substrates, and can be applied by any of a number of methods known in the art.

"Liquid vehicle" refers to the liquid in which colorant is placed to form an ink. Many liquid vehicle components are known in the art. However, the use of specific components at specific amounts can provide improved ink-jet ink characteristics. Typical liquid vehicles can include a mixture of a variety of different agents, such as surfactants, solvents, co-solvents, buffers, biocides, sequestering agents, viscosity modifiers, and water, for example.

"Spacer group" refers to intermediate groups or tethering agents, such as silanes, siloxanes, or other know couplers that can be used to attach reactive groups to an inorganic porous particulate. Spacer groups are not required, as properly configured inorganic porous particulates and reactive groups can be attached directly to one another. If a spacer group is present, the group can include an organic chain that provides appropriate space between a porous particulate and a reactive group, as is generally known in the art. Whether such an organic chain is considered part of the reactive group, or part of the spacer group is not important, as in certain circumstances, either or both characterization can be considered true.

With these definitions in mind, the present invention can be embodied in a system for producing permanent ink-jet images, The system can comprise a media substrate coated with a porous media coating, and an ink-jet ink including a dye, The porous media coating can comprise inorganic porous particulates, wherein at least a portion of the inorganic porous particulates have a first reactive group covalently attached thereto. The dye of the ink-jet ink can comprise a second reactive group, wherein the first reactive group and the second reactive group are configured to react with one another upon contact to form a covalent bond.

The present invention can also be embodied in a method of producing permanent ink-jet images. The steps of such a method can include a) covalently bonding a first reactive group to an inorganic porous particulate; b) coating the inorganic porous particulate onto a media substrate to form a coated media substrate; and c) ink-jetting a dye-containing ink-jet ink composition onto the coated media substrate. The dye of the ink-jet ink can comprise a second reactive group attached thereto, wherein the first reactive group and the second reactive group interact upon contact to form a covalent bond.

Still further, the present invention provides a printed image on a media substrate comprising a media substrate coated with a porous coating, and an ink-jet ink including a dye printed on the porous coating. The porous coating can comprise inorganic porous particulates, wherein at least a portion of the inorganic porous particulates have a first reactive group covalently attached thereto. The dye of the ink-jet ink can include a second reactive group, wherein the first reactive group and the second reactive group are covalently bonded to one another.

The formation of covalent bonds between dyes and porous coating material has provided a means of generating relatively permanent images with fewer drawbacks. Image permanence improvements have previously been attempted via modification of the ink composition. They have also been attempted via modification of the media. One method of binding dyes in ink-jet media employs dyes and media of opposite charge. In these cases, polymeric cationic species are often used as mordants in ink-jet media for the immobilization of anionic dyes present in the ink. Coulombic interactions between positively charged mordants and negatively charged anionic dyes tend to keep the colorant in place. However, a deficiency of such an approach is that other competing anionic species may displace dye anions through ion exchange from mordant sites, resulting in colorant migration. Additionally, surface modification of porous media coatings are often carried out in organic solvents, which can be costly and complicated to scale up, as well as pose environmental concerns.

One advantage of the present invention is the ability to provide permanent ink-jet images with improved water and moisture durability by forming covalent bonds. This improved durability is achieved through the formation of covalent bonds between dye-based colorants of an ink and surface-modified porous inorganic particulates of an ink-receiving layer of ink-jet media. Unlike other methods that rely on Coulombic interactions, covalent bond formation between the ink receiving layer of the media substrate and the dyes of the ink-jet ink more effectively immobilizes the colorants and prevents dye migration. As a result, humid fastness and water fastness can be improved as compared to the use of Coulombic interactions between charged dye molecules and the coating on the media substrate.

With respect to the systems, methods, and printed images of the present invention, many variables can be practiced within the scope of the present invention. For example, the inorganic porous particulates can comprise a member selected from the group consisting of silica particulates, alumina particulates, titania particulates, zirconia particulates, organo-metallic particulates, and combinations thereof. With respect to matching the first reactive group with the second reactive groups such that a covalent bond forms after contact, various reactive groups can be used. For example, one of the first and second reactive groups can be an aldehyde or an epoxy, and the other of the first and second reactive groups can be an amine. Alternatively, one of the first and second reactive groups can be an aldehyde, and the other of the first and second reactive groups can be a thiol or an amide. Other reactive groups can also be used as would be known to those skilled in the art. In these and other embodiments, the covalent nature of the attachment of a dye to a media substrate via the porous coating can serve to fix the dye upon ink-jetting, resulting in an image that has improved water fastness characteristics. Most of these reactions can occur when water is removed from the system. How quickly the dye and the modified porous coating of the media substrate react with one another can depend in part upon temperature and/or the presence of an optional added catalyst or reaction promoter. In some slower reactive embodiments, without a catalyst, the reaction can take a greater amount, e.g., in the order of days or weeks, to complete at room temperature. With a catalyst or temperature modification, the reaction time can be on the order of seconds or minutes. Of course, in other embodiments, reactions can be inherently more rapid, depending on the reactive components selected for use.

In carrying out embodiments of the present invention, many preparative examples can be embodied. For example, a first reactive group can be covalently bonded to an inorganic porous particulate by attaching the inorganic porous particulate or through a silane spacer group. In this embodiment, inorganic porous particulate modification can be carried out according to the following general description, using either a halo or alkoxy silane. First, the particulate can be dried in a vacuum at an elevated temperature to remove adsorbed moisture. The dried particulate can then be allowed to cool down to room temperature. The solvent in which the reaction to modify the silica is carried out can then be dried with an appropriate drying agent. Common solvents that can be used include toluene, dichloromethane, isopropanol, and methanol. Next, the particulate can be mixed in the dry solvent, such as by being dispersed in the solvent by sonication or high energy mixing. The amount of solvent used can be selected such that the silane reagent concentration (when added) does not generally exceed about 10% of the total solvent.

The vessel containing the particulates/solvent mixture can be flushed with dry nitrogen, and then the silane reagent can be introduced into the reaction vessel. The amount of reagent added depends on the surface area and the hydroxy group concentration of the particulates. When selecting the reaction conditions, reactivity can be considered. For example, alkoxy silanes are less reactive than halo silanes. Thus, reaction times and temperatures can be adjusted after considering the reagent used. The determination of such conditions is within the capability of one skilled in this art. Typically, about one to six hours of refluxing under dry nitrogen is adequate. If carried out at room temperature rather than at elevated temperatures, longer reactions times might be desired.

After the reaction is completed, the product material can then be filtered and washed with excess solvent, and then dried. This reaction can also be carried out without the use of excess reagent, thus eliminating the need to remove excess reagent by washing. Methanol is an example of one solvent that can be used with halo or alkoxy reagents. An advantage of using methanol is that if small amounts of it remain in the product, since it is miscible with water, it is not problematic in subsequent coating steps, particularly when methanol is used in the coating step itself.

Regarding the coating of the inorganic porous particulates on the media substrate, it is contemplated that the surfaces of inorganic porous particulates can be covalently modified with reactive groups either by first reacting the reactive group with the inorganic particulates in water and then coating the resulting composition on a media substrate, or alternatively, coating the inorganic particulates on a media substrate and then reacting the reagent with the inorganic particulates on the media substrate. The coating composition can be coated onto a media substrate by using any of a number of methods known in the art, including the use of an air knife coater, a blade coater, a gate roll coater, a doctor blade, a Meyer rod, a roller, a reverse roller, a gravure coater, a brush applicator, a sprayer, or any other coating means known to one skilled in the art. Additionally, the coating composition can be bound together by a polymeric binder. In some embodiments, it may be desirable to include mordants and/or other additives in the coating composition. Also, additives such as surfactants and/or solvents can be incorporated to the coating composition to enhance uniform wetting/coating, though neither is required for use.

Regarding the first reactive group that is present on the porous particulates of the porous media coating, the group can include any active portion of a reagent that provides a function at or near the surface of inorganic particles that are present in a porous media coating, and which is not inherent to an unmodified inorganic porous particulate. Thus, when referring to the first reactive group, it includes groups that are reactive with a dye, and which have been covalently attached to the porous particulates, either directly or through a spacer group. Additionally, the first reactive groups can be attached to all inorganic porous particulates present in a coating, or only to a portion of the inorganic porous particulates present in a coating, provided the particulate reactive groups are present in sufficient quantity to adequately bind at least some dye molecules after contact.

Similarly, when referring to the second reactive group that is present on a dye of an ink-jet ink, the second reactive group can be any active portion of a dye that provides a function at or near the surface of the dye. It is contemplated that the second reactive group can be attached to the dye by chemical modification, or it may be inherent to the dye structure itself. Thus, when referring to a dye that includes a reactive group, it is understood that it can be inherently present, or modified to include that reactive group.

In the following formulas, silica and alumina are used to exemplify inorganic porous particulates that can be used in accordance with embodiments of the present invention. It is recognized that other inorganic porous particulates can be used as well, such as titania, zirconia, organo-metallic material, etc. Additionally, only a single attachment point between the porous particulate and the reactive spacer groups are shown, though several attachment points can be present. For example, if one or more of X is halogen, alkoxy, hydroxyl, etc., that group can react with the porous particulate to form additional points of attachment, i.e., from 1 to 3, between the silane reagent and the porous particulate. In other words, the attachment of a silane group can occur at a single location or at a plurality of locations, depending on what each X represents. Alternatively, one or more X can be a more inert group that is nonreactive with the porous particulate, such as methyl or ethyl. Still further, each X can alternatively include an additional reactive group that is intended to be reactive with a dye that will be printed thereon. Thus, more than one "first reactive group" can extend from a single attachment grouping. Additionally, R is intended to illustrate an optional spacer group that can be used to separate the first reactive group from the porous particulate. Thus, R can be branched or straight lower alkyl, methylene, dimethylene, trimethylene, or tetramethylene, to name a few examples.

Formula 1 shows an example reaction wherein the silane spacer utilizes the halogen chlorine for reaction with a silica surface.

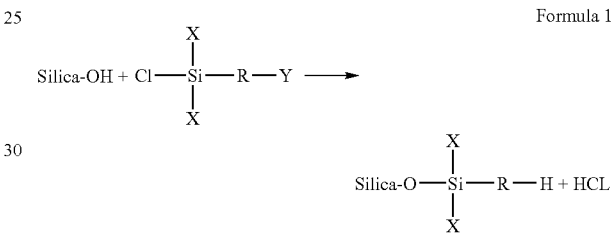

Formula 1

Formula 2 provides a reaction scheme wherein the silane spacer reacts with a silica surface via a methoxy group.

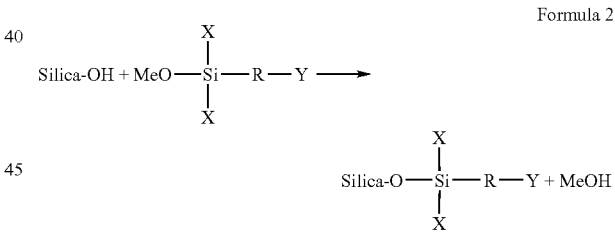

Formula 2

One embodiment can include a porous particulate, such as silica, wherein the surface of the porous particulate is covalently modified with an aldehyde group. Further, a dye including an amine group can be present, which will react with the aldehyde upon contact to form a covalent bond, as shown in Formula 3.

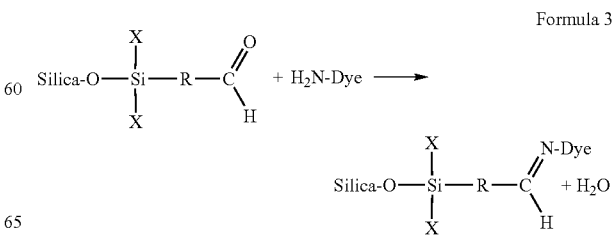

Formula 3

Conversely, the dye can include an aldehyde group, and the amine group can be covalently bonded to the porous particulate, as shown in Formula 4.

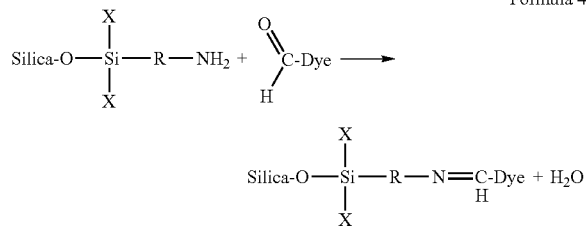

Formula 4

The dye-particulate interaction in Formulas 3 and 4 above results in the formation of a Schiff's Base and the covalent bonding of the dye to the surface of the particulate.

Formula 5 depicts another embodiment of the present invention, wherein the surface of the particulate, in this case alumina, is covalently modified with epoxy groups, and the dye includes an amine group. The dye-particulate interaction results in covalent bonding of the dye to the surface of the particulate.

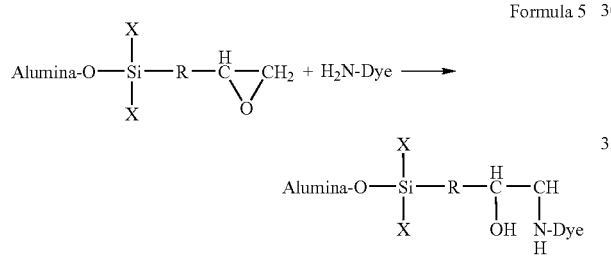

Formula 5

Conversely, the dye can include an epoxy group, and the amine group can be covalently bonded to the particulate, as shown in Formula 6.

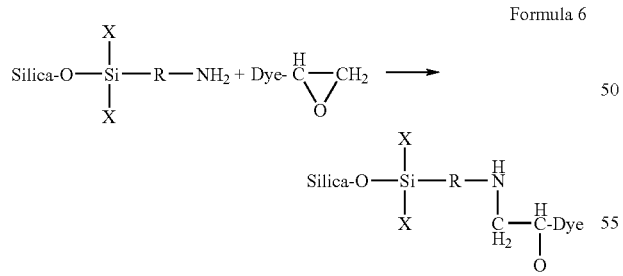

Formula 6

Formula 7 shows an esterification embodiment of the present invention, wherein the surface of the particulate is covalently modified with carboxyl groups, and the dye includes a hydroxyl group. The reaction produces an ester that covalently attaches the dye to the particulate. It is also contemplated that the starting compounds can be a dye including carboxyl group, and a hydroxyl group covalently bonded to the particulate.

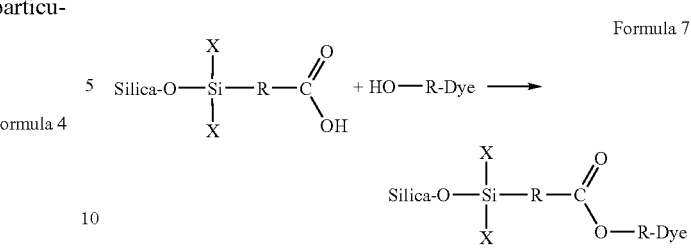

Formula 7

Formulas 8 and 9 provide examples which utilize activated methoxy groups, wherein the surface of the particulate is covalently modified with activated methoxy groups, and the dye includes an amide group (Formula 8) or a hydroxyl group (Formula 9). The reaction may occur at either methoxy group. The dye-particulate interaction results in covalent bonding of the dye to the surface of the particulate. Alternatively, the methoxy can be present on the dye and the amide or hydroxyl group can be present on the porous particulate.

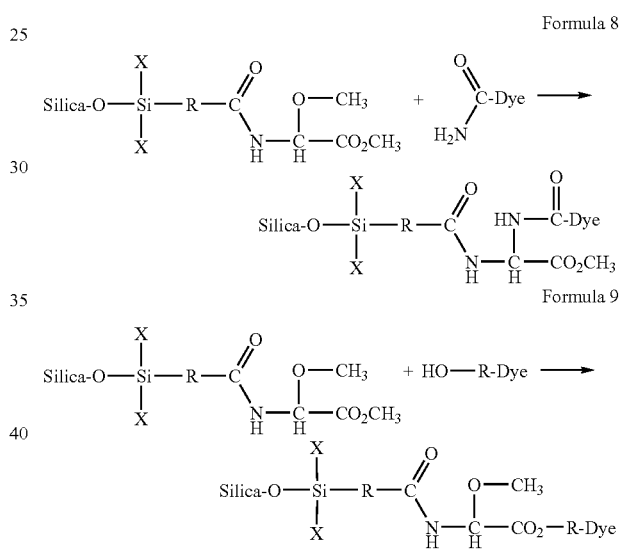

Formula 8

Formula 9

Formulas 10 and 11 depict examples which utilize alkyl methylol groups. In Formula 10, the surface of the particulate is covalently modified with N-methylolamide groups, and the dye includes an amide group. The dye-particulate interaction results in covalent bonding of the dye to the surface of the particulate.

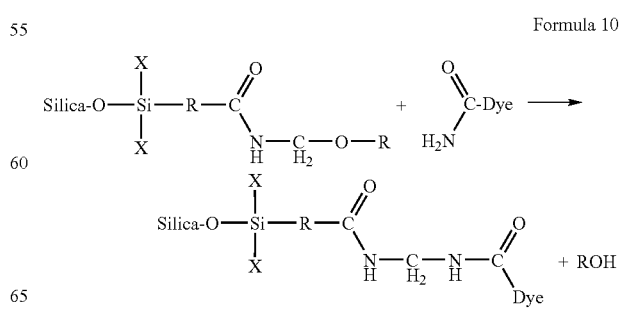

Formula 10

Conversely in Formula 11, the surface of the particulate is covalently modified with amide groups, and the surface of the dye includes an N-methylolamide groups.

Formula 11

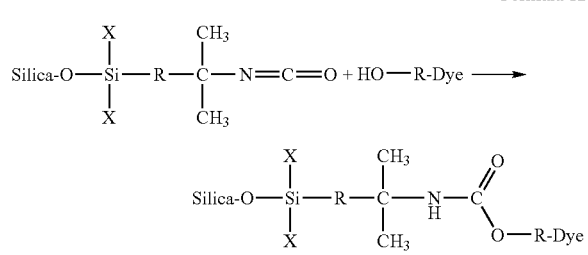

Formulas 12 and 13 show examples of hindered isocyanate embodiments of the present invention. In Formula 12, the surface of the particulate is covalently modified with hindered isocyanate groups, and the dye includes a hydroxyl group. The dye-particulate interaction results in covalent bonding of the dye to the surface of the particulate.

Formula 12

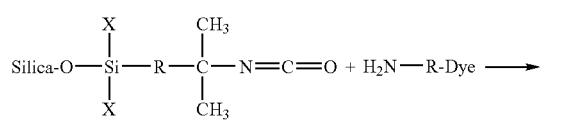

In Formula 13, the surface of the particulate is covalently modified with hindered isocyanate groups, and the dye includes an amine group.

Formula 13

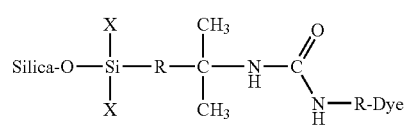

Formulas 14 and 15 show examples of dihydrazide embodiments of the present invention. In Formula 14, the surface of the particulate is covalently modified with acetyl groups, and the dye includes a dihydrazide group. The dye-particulate interaction results in covalent bonding of the dye to the surface of the particulate.

Formula 14

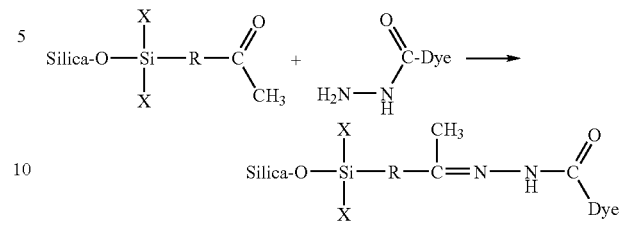

In Formula 15, the surface of the particulate is covalently modified with dihydrazide groups, and the dye includes an acetyl group.

Formula 15

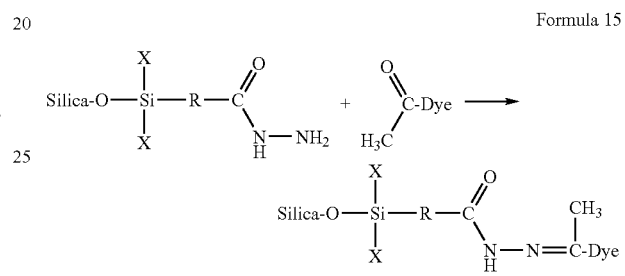

Formulas 16-19 provide examples that utilize capped aldehydes. In Formula 16, the surface of the porous particulate is covalently modified with a capped aldehyde group, and the dye includes an amide group. The dye-particulate interaction results in covalent bonding of the dye to the surface of the particulate.

Formula 16

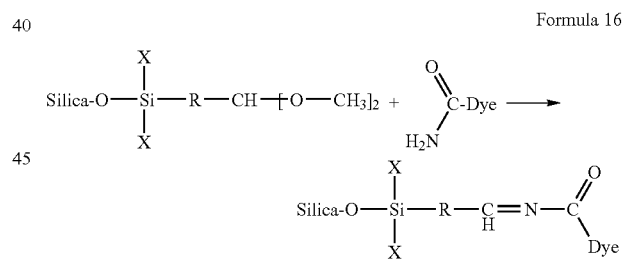

In Formula 17, the surface of the porous particulate is covalently modified with a capped aldehyde group, and the dye includes an amine group.

Formula 17

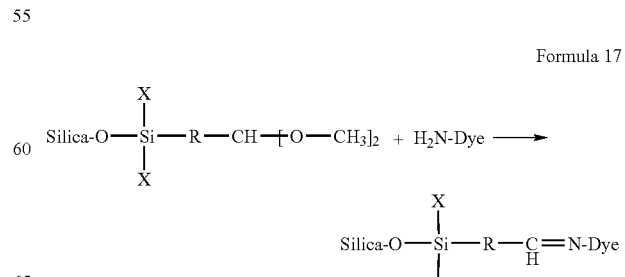

In Formula 18, the surface of the porous particulate is covalently modified with an amine group, and the dye includes a capped aldehyde group.

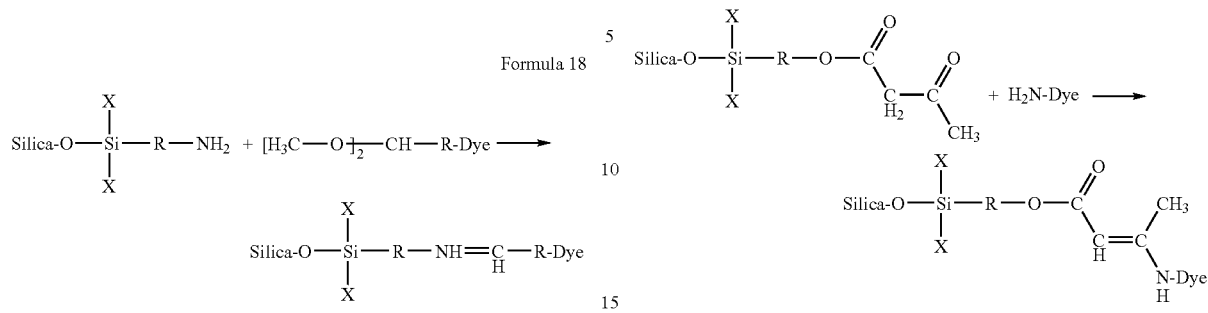

Formula 18

In Formula 19, the surface of the particulate is covalently modified with an amide group, and the dye includes a capped aldehyde group.

Formula 19

Formulas 20-22 provide examples of diketone or acetylacetoxy embodiments of the present invention. In Formula 20, the surface of the particulate is covalently modified with a diketone or acetylacetoxy group, and the dye includes amine group. The dye-particulate interaction results in covalent bonding of the dye to the surface of the particulate.

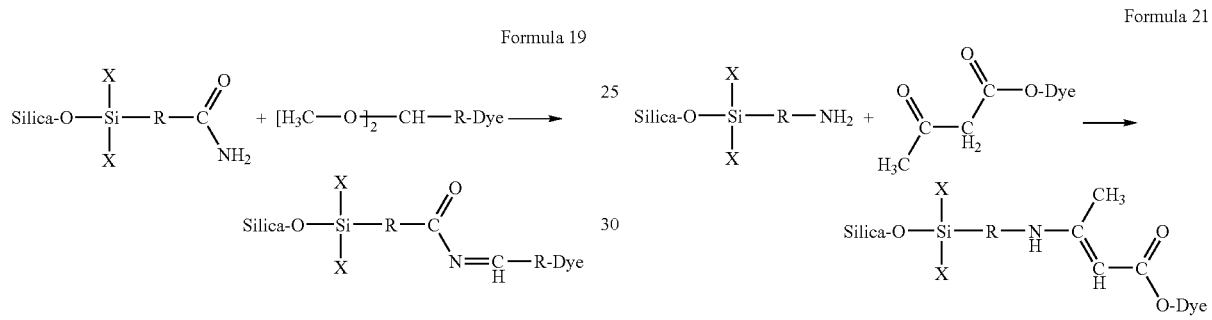

Formula 20

In Formula 21, the surface of the particulate is covalently modified with amine groups, and the dye includes a diketone or acetylacetoxy group.

Formula 21

In Formula 22, the surface of the particulate is covalently modified with diketone or acetylacetoxy groups, and the dye includes a diketone or acetyl acetoxy group. The dye-particulate interaction results in covalent bonding of the dye to the surface of the particulate.

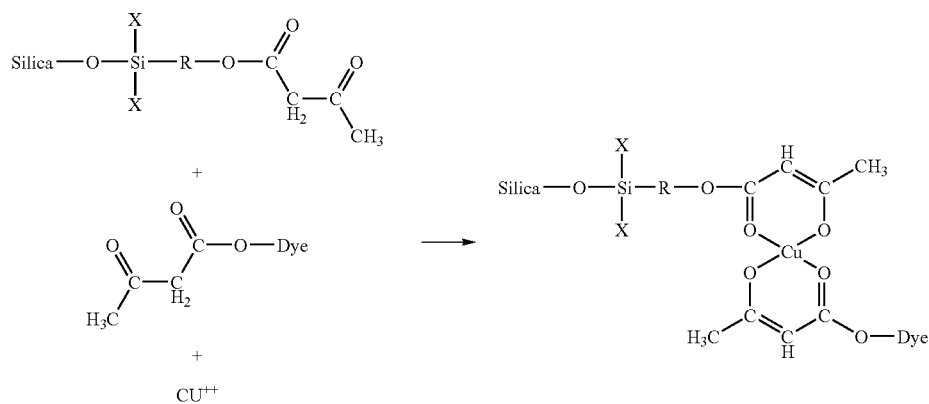

Formula 22

The above Formulas are provide for exemplary purposes only, and various modifications of such can be practiced as would be known to those skilled in the art after considering the present disclosure. For example, various X groups, various spacer R groups, various first and second reactive groups, various porous particulates, various dyes, and the like can be used in accordance with embodiments of the present invention.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Preparation of Modified Silica with Reactive Group

In a reaction vessel, about 40 grams of silica to be modified is dried overnight in a vacuum at about 110° C. to remove the adsorbed moisture. The dried silica is then allowed to cool to room temperature. Next, about 500 ml of methanol is dried over calcium sulfate. The dried silica is then mixed with the dried methanol and the silica is dispersed in methanol by sonication or high sheer agitation. Dry nitrogen is then passed into the reaction vessel at a slow rate to eliminate ambient moisture. A halo silane reagent including an epoxy reactive group is then injected into the reaction vessel. The reaction mixture is then stirred at ambient temperature or refluxed. The amount of silane reagent used in the reaction is dependent on the surface area of the silica, the surface silanol concentration of the silica, and the functionality of the reagent. Once this process is complete, the product is then filtered. If excess reagent is used, it may be removed by washing with dry methanol. In either case, the product is then dried. At this point, the product was mixed with binder and coated on a media substrate.

Example 2

Preparation of Ink-jet Ink Composition

A blue ink-jet ink composition containing a dye reactive with the porous coating material prepared in Example 1 was prepared in accordance with Table 1 below:

TABLE 1

| Ingredient | wt % |
| --- | --- |
| 1,2-hexanediol | 11.5 |
| Dipropylene Glycol Monobutyl Ether | 0.5 |
| Tergitol 15-S-5 | 0.25 |
| Tergitol 15-S-7 | 0.25 |
| MOPS Buffer | 0.15 |
| EDTA (free acid) | 0.1 |
| Proxel GXL | 0.2 |

TABLE 1-continued

| Ingredient | wt % |
| --- | --- |
| Reactive Blue 15 | 2 |
| Water | 85.05 |

Reactive Blue 15 was selected as it includes an $NH_2$ group that is reactive with the epoxy group present on the porous media prepared in accordance with Example 1. After printing the ink-jet ink of Table 1 one onto the media prepared in accordance with Example 1, the dye became covalently fixed to the modified particulates of the coating.

Example 3

A red ink-jet ink composition containing a dye reactive with the porous coating prepared in Example 1 was prepared in accordance with Table 2 below:

TABLE 2

| Ingredient | wt % |
| --- | --- |
| 1,6-hexanediol | 9 |
| 2-Pyrrolidone | 4 |
| EDTA, Na salt | 0.1 |
| Proxel GXL | 0.15 |
| Tergitol 15-S-5 | 0.85 |
| Dowfax 2A1 | 0.32 |
| Acid Red 37 | 2 |
| Water | 83.58 |

Acid Red 37 (diammonium salt form from Aldrich, Catalogue No. 51,105-6) was selected as it includes an $NH_2$ group that is reactive with the epoxy group present on the porous media prepared in accordance with Example 1. After printing the ink-jet ink of Table 2 onto the media prepared in accordance with Example 1, the dye became covalently fixed to the modified particulates of the coating.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A method of producing permanent ink-jet images, comprising: a) covalently bonding a first reactive group to an inorganic porous particulate; b) coating the inorganic porous particulate onto a media substrate to form a coated media substrate; and c) ink-jetting a dye-containing ink-jet ink composition onto the coated media substrate, said dye including a second reactive group, wherein the first reactive group and the second reactive group interact upon contact to form a covalent bond.

2. A method as in claim 1, wherein the inorganic porous particulates comprise a member selected from the group consisting of silica particulates, alumina particulates, titania particulates, zirconia particulates, organo-metallic particulates, and combinations thereof.

3. A method as in claim 1, wherein one of the first and second reactive groups is an amine, and the other of the first and second reactive groups is selected from the group consisting of an aldehyde, an epoxy, an alkyl methylol, a capped aldehyde, a diketone, an acetylacetoxy, and a hindered isocyanate.

4. A method as in claim 1, wherein one of the first and second reactive groups is an aldehyde, and the other of the first and second reactive groups is selected from the group consisting of a thiol and an amide.

5. A method as in claim 1, wherein one of the first and second reactive groups is a hydroxyl, and the other of the first and second reactive groups is selected from the group consisting of a carboxyl, an activated methoxy, and hindered isocyanate.

6. A method as in claim 1, wherein one of the first and second reactive groups is an amide, and the other of the first and second reactive groups is selected from the group consisting of an alkyl methylol, an activated methoxy, and a hindered isocyanate.

7. A method as in claim 1, wherein one of the first and second reactive groups is an acetyl, and the other of the first and second reactive groups is a dihydrazide.

8. A method as in claim 1, wherein the first reactive group is attached to the inorganic porous particulate through a silane spacer group.

* * * * *